Aug. 8, 1950 — G. P. HERRICK — 2,518,008
CONVERTIBLE AIRCRAFT
Filed June 1, 1945 — 5 Sheets-Sheet 1

INVENTOR.
GERARD P. HERRICK
BY Bartlett Eyre Keel & Weymouth
ATTORNEYS

Aug. 8, 1950     G. P. HERRICK     2,518,008
CONVERTIBLE AIRCRAFT Filed June 1, 1945     5 Sheets-Sheet 3

INVENTOR.
GERARD P. HERRICK
BY Bartlett Eyre Keel & Weymouth
ATTORNEYS

Aug. 8, 1950        G. P. HERRICK        2,518,008
CONVERTIBLE AIRCRAFT Filed June 1, 1945                                              5 Sheets-Sheet 4

INVENTOR.
GERARD P. HERRICK
BY
Bartlett Eyre Keel & Weymouth
ATTORNEYS

Aug. 8, 1950

G. P. HERRICK

2,518,008

CONVERTIBLE AIRCRAFT

Filed June 1, 1945

INVENTOR.
GERARD P. HERRICK

BY Bartlett Eyre Keel & Weymouth

ATTORNEYS

Patented Aug. 8, 1950

2,518,008

UNITED STATES PATENT OFFICE 2,518,008

CONVERTIBLE AIRCRAFT

Gerard P. Herrick, New York, N. Y.

Application June 1, 1945, Serial No. 596,987

25 Claims. (Cl. 244—7)

My invention relates to multiple flight convertible aircraft.

More particularly my invention relates to a heavier than air aircraft which is operable either as a helicopter driven rotor craft, an auto-rotating rotor craft or as a fixed surface plane and is convertible with certainty and safety from either type of craft to the other while in the air.

In other words, it is capable of taking off, flying and landing in any of the three types of flight mentioned as well as being convertible from one to the other while in the air.

In my prior Patent No. 1,792,014 issued February 10, 1931, I have shown a convertible craft which is operable and convertible while in the air from a fixed surface plane to an auto-rotating rotor craft. The practicability of the craft illustrated in that patent has been demonstrated by the building of a full size machine, and repeated flights taking off, flying and landing as an airplane, taking off, flying and landing as an auto-rotating craft, and converting from airplane flight to auto-rotating flight in the air.

However, the aircraft built under my prior patent was incapable of operation as a helicopter and was incapable of conversion while in the air to or from a helicopter or from an auto-rotating craft to a fixed surface type plane and therefore its usefulness was limited. For example, it did not include the important features of vertical take-off, high speed efficient fixed wing flight following such take-off and hovering and vertical landing. The craft of my present invention embodies all of these important features in addition to those included in my prior patent whereby the advantages of the speed and efficiency of the airplane is combined in a single machine with the safety and convenience of the rotating wing machine.

The craft of my present invention also embodies improvements over the fixed surface plane and auto-rotating rotor features of my prior patent.

One object of the invention is a combined helicopter driven rotor and auto-rotating rotor craft capable of sustained flight as either type and readily convertible from one to the other.

Another object of the invention is a combined helicopter driven auto-rotating rotor and fixed surface craft capable of sustained flight as either of said types of craft and readily convertible from one type to the other.

A further object of the invention is a novel and improved combined helicopter driven rotor and fixed surface craft capable of sustained flight as either type of craft and readily convertible from either type of craft to the other.

A further object of the invention is a convertible craft of the character above indicated embodying oppositely rotatable lifting surfaces, and a further object is such a craft embodying a novel and improved rotor control.

A further object of the invention is a combined rotary and fixed surface craft readily convertible from one type of craft to the other wherein certain of the controls are utilized for both rotary and fixed surface operation.

A further object of the invention is a combined rotary and fixed surface craft convertible from the rotary to the fixed surface type while in the air with a conversion control assuring sustaining lift of the craft during such conversion.

A further object of the invention is a combined rotary and fixed surface craft capable of conversion from either type to the other and of sustaining flight as either type, including novel and improved control means while operating as either type.

A further object of the invention is a combined rotary and fixed surface craft capable of ready conversion from either type to the other and sustaining flight as either type and including novel and improved converting means and novel and improved control means for controlling the craft during either type of operation.

A further object of the invention is a combined rotary and fixed surface craft convertible from either type to the other and including novel and improved means for arresting, orienting and locking the surface in fixed operating position.

A further object of the invention is a combined rotary and fixed surface craft convertible from either type to the other and including means responsive to the conversion means for variation of the traction and lift of the craft.

A further object of the invention is a craft of the above-indicated character and control therefor embodying a single control element by the manipulation of which converting operations may be readily effected and in the desired order.

A further object of the invention is a craft embodying oppositely rotating surfaces with means for varying the torque of one surface with respect to the other surface for control.

A further object of the invention is a novel and improved landing gear.

Further objects of the invention will hereinafter appear.

For a better understanding of the invention reference may be had to the accompanying drawings forming a part of this application, wherein

Fig. 12 shows diagrams illustrating the order of the steps in conversion.

Referring to the drawings the invention is illustrated as embodied in an aircraft comprising a main body or fuselage 1, an upper wing 2 and a lower wing 3. The craft may be provided with any suitable or conventional landing gear as, for example, the landing gear halves 4 and a forward landing gear unit 5. These landing gears may be embodied in any suitable or conventional retracting means for retracting and housing the same in the fuselage 1 and for distending the same to the operative position for landing. A conventionally arranged empennage is illustrated comprising a horizontal stabilizer 6, an elevator 7, a vertical fin 8, and a rudder 9. A tail skid 10 is also provided and a traction propeller 11 is illustrated which is driven by a power plant 12 schematically shown.

As above stated the craft is convertible for operation either as a gliding type of craft, a helicopter or an auto-rotative gyro. When operating as a glider the upper and lower wings 2 and 3 are fixed against rotation. When operating as a rotary wing craft the wings 2 and 3 rotate in opposite directions with all the advantages incident thereto when operating either as a helicopter or as a gyro.

Figures 4, 5, 5A, 5B, 6:
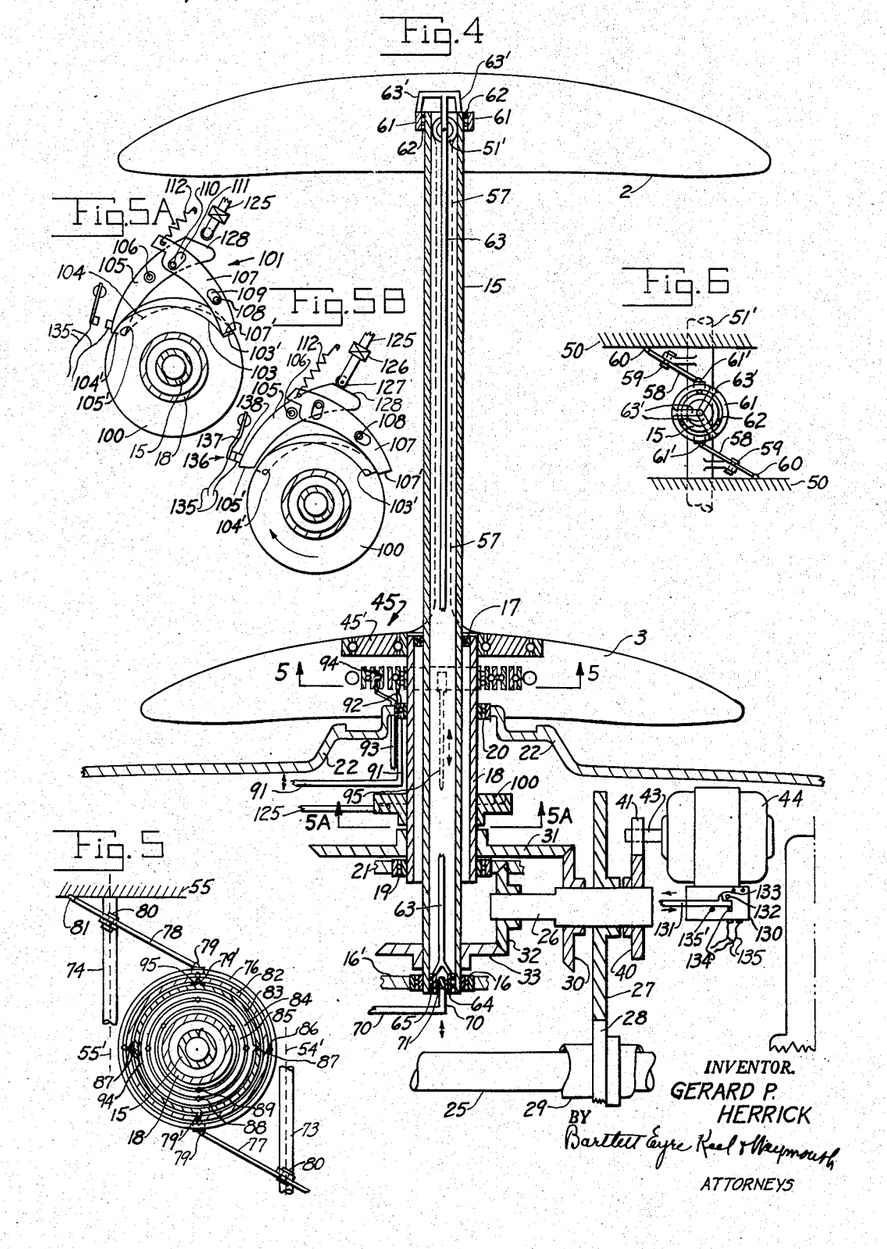
Fig. 4 is a diagrammatic view partly in cross-section illustrating the drive for the convertible lifting surfaces and controls.
Fig. 5 is a section along the line 5—5 of Fig. 4.
Figs. 5a and 5b are views of the locking means for the convertible lifting surfaces.
Fig. 6 is a diagrammatic view illustrating the adjusting means for the control of the upper wing.

Fig. 4 illustrates somewhat diagrammatically the mounting of the wings 2 and 3 and the drive for rotation and the transmission, it being understood the drive and transmission are for illustrative purposes only and that other drives and transmissions may be used. The upper wing 2 is mounted on the upper end of the central hollow shaft 15 which is journaled in bearings 16 disposed at the lower end of bearings 17 which in the particular embodiment shown are disposed between the upper and lower surface of the wing 3. The wing 3 is mounted on the upper end of a hollow shaft 18 of larger diameter than the shaft 15 and surrounding the latter and in the particular embodiment shown a bearing 17 is disposed between the upper end of the shaft 18 and the shaft 15. The shaft 18 is journaled in a set of lower bearings 19 and an upper set of bearings 20, these bearings 19 and 20 being carried by parts of the aircraft frame indicated at 21 and 22, respectively. The part of the frame for retaining the bearing 16 is designated 16'.

The drive for rotating the shafts 15 and 18 carrying the wings 2 and 3 comprises a main drive shaft 25 suitably journaled and mounted on some fixed part of the craft, as for example the fuselage 1 and driven by the main power plant 12. This shaft is for driving the wings 2 and 3 when operating as a helicopter. A transmission between the shaft 25 on the one hand and the vertical shafts 15 and 18 on the other, is illustrated as comprising a shaft 26 which is also suitably journaled and mounted in the fuselage 1 and carries a gear 27 which meshes with a gear 28 keyed to a sleeve 29 surrounding the shaft and capable of being coupled thereto, as hereinafter described. There is also keyed to the shaft 26 a bevel gear 30 meshing with the bevel gear 31 keyed to the vertical shaft 18 for rotating the lower wing 3. The shaft 26 also carries a bevel gear 32 which meshes with the bevel gear 33 which is keyed to the vertical shaft 15 for rotating the upper wing 2.

Figure 9:
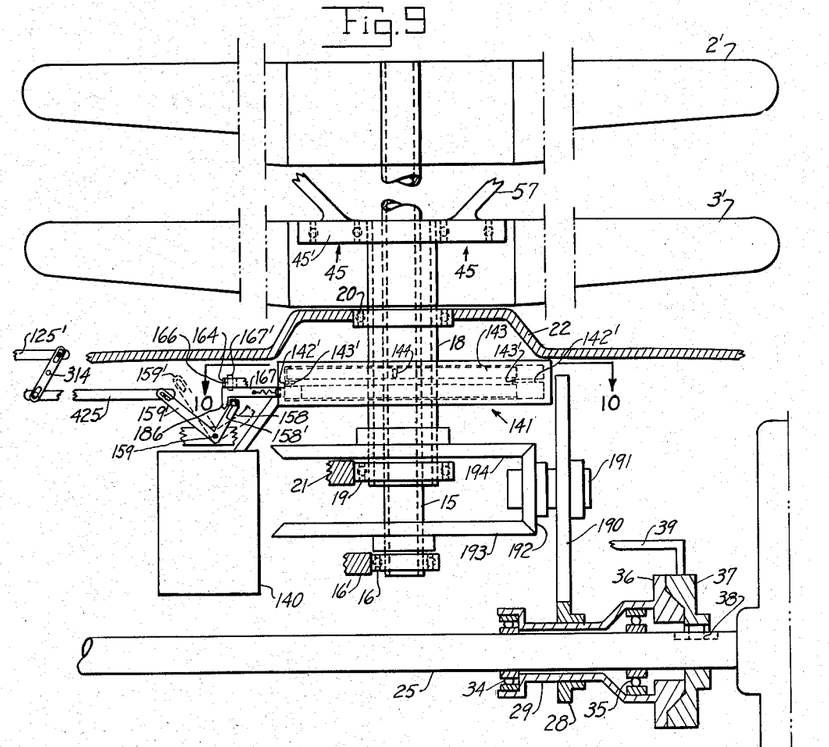
Fig. 9 illustrates a modification of the craft.

The sleeve 29 which surrounds shaft 25 is journaled upon the shaft 25 by means of the bearings 34 and 35 and carries a clutch element 36 which cooperatively functions with another clutch element 37 which is keyed to the shaft 25 (Fig. 9). The clutch element 37 is keyed to the shaft 25 by means of a key 38 sliding in a slot on the shaft 25 and means are shown at 39 for actuating the clutch element 37 to couple and uncouple the shaft 25 with the drive shaft 26.

The shaft 26 also carries on its righthand end (Fig. 4) a spur gear 40 which meshes with another spur gear 41 keyed to the shaft 43 of a starting motor 44. The motor 44 is utilized for starting the rotation of the wings 2 and 3 from rest upon conversion from fixed wing to rotary wing operation and for that purpose it may be of any suitable type of motor, as for example, electric, hydraulic or air. By this means the wings 2 and 3 may be started to auto rotative speed even if the main power plant fails.

The upper wing 2 is provided with wing halves 50 which are adjustable about a transverse axis shown in dot-and-dash line 51 (Fig. 2) and in the particular embodiment shown the wing 2 is provided with a central section 53 which is not adjustable. The lower wing 3 is provided with wing halves 54 and 55 which are adjustable about transverse axes shown in dash lines 54' and 55' respectively. In the case of the lower wing the axes 54' and 55' are not located centrally of the wing cord but are located forwardly of the center line of the wing halves with reference to the clockwise rotation of the lower wing looking at Fig. 2.

One or both wings 2 and 3 may be provided with means for applying to the wing halves equal adjustments about their axes of adjustment for equal vertical lift control, differential or unequal adjustments, and periodic adjustments. By periodic adjustments is meant the application of certain angles of incidence to the wing halves at points in the rotation. In the particular embodiment of the invention illustrated the upper wing 2 is provided only with equal adjustments of the halves for vertical lift while the lower wing 3 is provided with all three controls.

The structure of the upper wing 2 comprises a shaft 51' extending longitudinally and centrally of the wing and passing through the hollow shaft 15 with the shaft 51' being rigidly fastened to the shaft 15. This shaft 51' is braced by the inclined struts 57 rigidly fastened at their upper end to the shaft 51' and at their lower end to the inner race 45' of the bearing 45 disposed about the upper end of hollow shaft 18.

The wing halves 50 are adjustable about the axis 51 (shaft 51') by a pair of links 58 pivotally fastened intermediate their ends at points 59 on brackets which are fixed relatively to the shaft 51'. One end of each of these links 58 is pivotally fastened to the frames of the wing halves 50 as indicated by ball socket joints at 60 and at their other ends are similarly fastened to a vertically adjustable ring 61 at 61'. The latter is vertically adjustable upon the upper end of the shaft 15 and bearings 62 provide for frictionless movements. The ring 61 is adjustable vertically, and longitudinally of the shaft 15, by means of a rod 63 passing through the shaft 15 and being connected at its upper end by three angle arms 63' to the ring 61. The lower end of the rod 63 is connected with a ring 64 which is guided by means of the bearings 65 in the lower part of the hollow shaft 15, in the particular embodiment shown the rod 63 having diverging arms connected with the ring 64. The rod 63 is journaled in and about the shaft 15 to provide for frictionless reciprocating vertical movements of this rod. Thus by actuating the rod 63 longitudinally of itself the wing halves 50 of the upper wing are adjusted about the axes 51, such that their leading edges move through equal angles toward and away from their plane of rotation. Such actuation of the rod 63 may be effected by any particular means and in any particular manner, and in the particular embodiment shown I have illustrated a control member 70 which is connected to the inner race 71 of the bearing 64 so that by actuating the control member 70 vertically the rod 63 is adjusted vertically to any desired angular position of the wing halves 50. The control member 70 is operated by manual operating connections having the same designating numeral 70 for convenience, as described below with respect to Figs. 7 and 8, these connections being purposely diagrammatic.

The wing halves 54 and 55 of wing 3 are, as described above, adjustable about axes 54' and 55'; and I have illustrated in Fig. 5 shafts 73 and 74 about which the wing halves are angularly adjustable. In the particular embodiment shown a narrow central portion 75 of the wing 3 is fixed against similar angular adjustments. The adjustments of the wing halves 54 and 55 about the shafts 73 and 74 are effected in the particular embodiment shown by a floating ring 76; this ring being operatively connected at diametrically opposite points with operating levers 77 and 78, which are in turn operatively connected with the structures of the wing halves 54 and 55. The lever 78 is shown connected to the floating ring 76 by means of a universal joint at 79 and the lever 77 has a similar connection, 79, with the ring 76 at a diametrically opposite point. The fulcrum points of the levers 77 and 78 are indicated at 80, being in the form of pivotal connections with a fixed part of the frame, as for example, the shafts 73 and 74. The other end of the lever 78 is connected by means of a universal joint 81 with a wing half 55, and the lever 77 is connected by a similar universal joint with the wing half 54 (being omitted from Fig. 5 for convenience). In the embodiment shown, the connections 81 between the lever 78 and the wing halves are disposed forwardly of the axes 54' and 55' (shafts 73 and 74) in the direction of rotation. Inside the ring 76 are disposed four concentric rings 82, 83, 84 and 85.

The ring 76 is journaled about the ring 82 for free relative rotation by means of the bearing race indicated at 86, and the rings 82, 83 and 84 are fixed against rotation. The ring 82 is pivotally connected at diametrically opposite points 79' to the ring 83, whereby these two rings 82 and 83 may assume relative angular positions about an axis determined by the pivots 79'. The ring 84 is likewise pivotally connected with the ring 83 at diametrically opposite points 87, so that these two rings 84 and 83 may likewise assume relative angular positions with respect to each other about an axis determined by the pivots 87 which is at right angles to the axis of pivots 79'. The stationary unit of rings 82, 83 and 84 is journaled about the shaft 18 by means of a bearing ring 85 having outer and inner races 88 and 89.

The bearing ring 85 is journaled to the ring 84 by means of a bearing race 88 so as to prevent relative vertical movements of the rings 84 and 85. The ring 85 is journaled about the shaft 18 by means of the bearing race 89 so as to permit vertical movements of the ring 85 with respect to the shaft.

Thus by imparting vertical movements to the bearing ring 85 the ring unit 82, 83, 84 and the floating ring 76 may be lifted and lowered vertically for adjusting the wing halves 54 and 55 about their axes 54' and 55' through equal angles for vertical lift control. The means for actuating this ring 85 and therefore the other rings indicated as a unit comprises a rod or operating member 91 which extends upwardly (Fig. 4) outside of the shaft 18 and is suitably fastened to this ring 85 as, for example, at a point or points indicated schematically at 92. This schematically illustrated operating rod or arm 91 leads to the control member bearing the same designating numeral illustrated in Figs. 7 and 8 and it is understood that by actuating the member 91 shown in Figs. 7 and 8, the ring 85 with the other rings shown outside thereof in Figs. 4 and 5, is moved vertically to effect the desired vertical lift control, the wing halves 54 and 55 being thereby adjusted about their axes 54' and 55' through equal angles.

By the means schematically illustrated the wing halves 54 and 55 may also be caused to assume varying angles as the wing 3 rotates, which control I term, for convenience "periodic control." This is effected by tilting the floating ring 76 about axes determined by the pairs of pivots 79' and 87. For example, for tilting the ring 76 about the axis determined by the pivots 79' an operating rod 93 is pivotally connected at 94 to one of the pivots 87 and by pushing up and pulling down on this rod 93, the rings 82 and 83 are tilted about the axis determined by the pivots 79'.

In a similar manner, the ring 76 may be tilted about the axis determined by the pivots 87 by a rod or operating member 95 fastened to the ring 83 at a pivot 79'. The operating members or rods 93 and 95 are schematically shown both in Figs. 4 and 5 and in Figs. 7, 8 and 8a and it is understood that when the correspondingly numbered parts (93 and 95) are actuated by the mechanism shown in Figs. 7, 8 and 8a that the desired tilting movements of the ring 76 about the transverse axes are obtained.

Thus when the craft is operating as a rotating wing craft the pilot has complete control of the rotors through manipulation of the control rods 63, 91, 93 and 95. When operating as a helicopter the vertical lift controls of the wings 2 and 3 may be effected by the manipulation of the rods 63 and 91, while the operation of the periodic controls of the wing 3 may be effected by manipulating the control members 93 and 95. When operating as a gyro the vertical lift controls of the rotating wing 3 are neutralized, and the vertical lift controls of the rotating wing 2 may also be utilized while the craft is operating as a rotating wing craft, although more efficient operation may be obtained by utilizing the vertical lift controls of the rotating wing 2 for obtaining increased lift of the combined rotating wing system.

The vertical lift controls of either or both of the rotating wings 2 and 3 may be employed for lateral control when the craft is operating as a fixed wing craft, as will be more particularly hereinafter set forth. Likewise the rotor controls or certain of them may be utilized for the other controls during fixed wing operation such, for example, as longitudinal control as will hereinafter appear.

The rotating wing system 2 and 3 may be oriented and locked for fixed plane operation in any suitable manner. A schematic means is shown in Figs. 4a and 5b for holding and locking the rotating wings 2 and 3 transversely of the fuselage for fixed wing operation. In the particular embodiment shown in Fig. 4, this means comprises a hub 100 keyed to the shaft 18 and a lock means 101 which cooperatively functions with the hub 100 to lock and hold the shaft 18 and thereby the rotating wing system in fixed position properly oriented for fixed wing operation. The hub 100 is formed on its periphery with a double spiral 103 and 104 terminated at their deepest points by the shoulders 103' and 104'. This lock means comprises a pivoted member 105 which is pivotally anchored to the frame of the craft at 106. One end of this locking member 105 is provided with a locking end surface 105' which engages the shoulder 104' of the spiral 104 in the locked position. This lock means comprises also a cooperating locking member 107 which is mounted on a pivot 108 fixedly carried by the frame, and the member 107 is provided with a slot 109 extending generally longitudinally of the locking member 107 to provide for relative longitudinal movement of the member and the pin 108. The member 107 overlaps the member 105 and is operatively connected therewith through a pin 110 fixed to the member 105 and a transverse slot 111 formed in the member 107 in which the pin 110 functions. The end of the member 107 adjacent the slot 111 is biased in a clockwise direction by spring 112 fastened at one end to the frame of the craft and at the other end to the member 107. This spring tends to cause the lefthand end of the slot 111 (Fig. 5a) to engage the pin 110. Fig. 5a shows the members 105 and 107 in locking position engaging with their end surfaces 105' and 107' functioning as locking lugs to engage respectively the shoulders 104' and 103'. In this position the rotor wings 2 and 3 are oriented and locked firmly in position for operating as fixed wings. Fig. 5b shows the position of the locking members 105 and 107 out of locking position with the rotor wings 2 and 3 rotating. As hereinafter more particularly described, the rotor wings 2 and 3 may be arrested in rotation. When so arrested the rotor wings 2 and 3 are oriented and locked by the means shown in Figs. 4, 5a and 5b. While the craft is operating as a rotary wing craft the members 105 and 107 are held out of locking engagement, as shown in Fig. 5b, by a control member 125 sliding in a guide 126 and having an operating end 127. The latter engages the end of the locking member 105 to rotate it clockwise about the pivot 106, thereby lifting the locking member 105' out of the path of the shoulder 104'. In the particular embodiment shown, the end 128 of the member 105 is indicated as having a surface which is roughly at right angles to the releasing member 125. When the member 125 is actuated to move towards the surface 128 and engage and operate the same, the end 105' of the member 105 is lifted from engagement with the locking shoulder 104' and through the pin slot operated connection 110—111 the lever 107 is operated counterclockwise about the pin 108 to lift the end 107' out of engagement with the shoulder 103', thereby completely releasing the hub 100 and thereby the shaft 18, transmission, and the shaft 15 for rotation.

When it is desired to arrest the rotation of the wings 2 and 3 for fixed plane operation, the operating member 125 is moved through the guide 126 from engagement with the operating surface 128 of the member 105, thereby freeing the member 105 for later orienting and locking operation. The end 105' of the member 105 is retained in the position shown in Fig. 5b out of alinement with the shoulder 104' by means of the member 107 through the pin slot connection 110—111, the member 107 being prevented from moving longitudinally of the slot 109 by the frictional engagement of the member 107 against the periphery of the hub 100. This frictional holding operation is also assisted by the spring 112 which pulls at an angle less than a right angle with one end of the member 107 thereby tending to hold the lefthand end of the slot 109 against the fixed pin 108. The shaft 18 and the hub 100 may be braked in any suitable manner to arrest the rotation. Upon the complete stoppage of the shaft 18 and the rotors a rotating means, hereinafter described, reverses the rotation of the system until the shoulder 103' engages the end 107' of the member 107, and the member 107 is thereby actuated through the length of the slot 109 to operate the member 105 counterclockwise about its pivotal connection 106 to cause the end 105' to move down into locking engagement with the shoulder 104'.

When an electric motor 44 is utilized for starting the rotating system to rotate from fixed wing operation, the same motor may be utilized for reversing the rotating force applied to the rotating system when the system comes to complete rest to effect the orienting and operating of the wings above described. Any suitable means may be provided for controlling the motor 44 in the starting, braking and reversing operations. These control means being conventional, the details thereof are omitted for convenience in illustration. This control means is schematically illustrated as being contained in a control unit 130 (Fig. 4). A primary control member 131, which reciprocates horizontally (Fig. 4), when operated to the right from the position shown, engages a starting switch member 132 by means of a lug 133 carried by the primary member for connecting the motor 44 in circuit for starting the rotating wing system from fixed plane position. The motor 44 is required only to bring the speed of the rotor wings 2 and 3 to a point where the auto-rotation takes over and speeds the wings 2 and 3 above that of the motor 44, whereupon the motor 44 is automatically disconnected from its power circuit by a means contained in the control box 130, and the motor 44 simply runs free with no power thereon while the craft is operating as a gyro or as a helicopter. When it is desired to convert to fixed plane operation, the rotor wings must be braked and brought down to zero speed. This braking may be accomplished by any arrangement of suitable braking means, and the motor 44 may be converted to a generator supplying current to a load circuit for assisting in their braking and slowing operation. For this purpose the primary control member 131 is moved to the left, and this movement causes a lug 134 to engage a control member 135' which through a means contained in the box 130 connects the motor with a dynamic braking load circuit. When the motor 44 in the rotor wing system 2 and 3 comes to rest, an automatic means contained in the control box 130 is utilized to disconnect the dynamic braking circuit and to reconnect the motor 44 with the power circuit for reverse operation through a circuit 135 which leads through a switch 136 operated by the locking and orienting control 101. This switch 136 comprises a contact carried by a spring arm 137 and a contact 138 carried by the arm 105, and when the arm 105 is engaged by the control member 125 to release the rotating system for rotation, this circuit 135 is closed at the switch 136, but the moment the locking member 105 goes into locking position with the shoulder 104', that reverse operation circuit of the motor 44 is interrupted. When the primary control member 131, is again moved to the right to actuate the starting switch control member 132, the latter, through the means contained in box 130, reconnects the motor 44 for forward rotation so as to start the rotating system.

The control members 125 and 131 may be manipulated in any suitable manner and by any suitable means, and preferably by the unitary member 85 and associated means hereinafter more particularly described.

Figure 10:
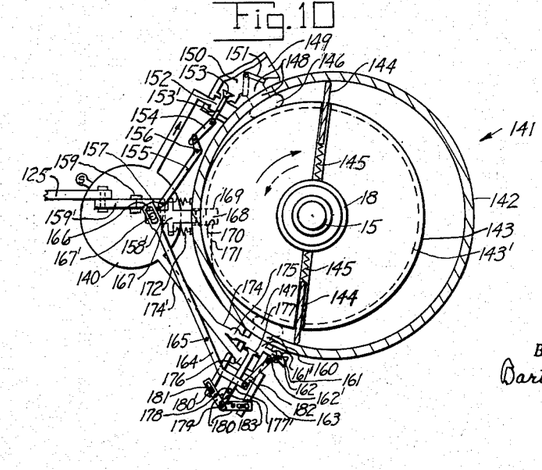
Fig. 10 is a view partly in section of the starting and braking means for the convertible lifting surfaces.

In Fig. 10 I have illustrated a fluid pressure power plant for starting the rotation of the rotors 2 and 3. This power plant comprises a storage tank 140 for fluid pressure, as for example air pressure, and a fluid motor 141. Any suitable type of fluid pressure motor may be utilized. In the particular embodiment shown I have illustrated a fluid pressure device of the vane type having a casing 142, an eccentrically mounted rotor 143 and vanes 144. The vanes 144 move inwardly and outwardly in slots 143 and are urged outwardly by spring 145 so as to cause their outer ends to engage the track of the casing 142 which they traverse. The fluid pressure motor 141 and the control therefor are schematically illustrated. It is provided with a pair of passages 146 and 147 which serve as the intake and exhaust passages for the motor and pump. The passage 146 leads to a chamber 148 which may be connected either with the atmosphere at 149 or with the chamber 150 by means of a swinging valve 151. The air flow determines the position of the valve 151. If the air is coming in from 149 in the valve, this valve will be in the dotted line position, and if the air is coming from the chamber 150, this valve will be in the full line position illustrated in Fig. 10. The chamber 150 is connected with a chamber 152 by means of a poppet valve 153, and the latter is provided with a stem 153' having a link connection 154 with one arm of a bell crank 155 pivotally fastened to the frame structure at 156. The other end of the longer arm of the bell crank 155 is pivotally fastened at 157 to the arm 158 of the bell crank pivoted at 159 to the frame whereby upon operation of the bell crank arm 158 the bell crank is actuated to open or close the poppet valve 153. The passage 147 of the motor is connected with a chamber 160. The chamber 160 leads out to the atmosphere through a pipe 161 in which is a flap valve 162 having an operating arm 162', the latter being connected by a link 163 with one end of a lever 164 pivotally mounted at 165. One end of the lever 164 is provided with a slot 166 which is operatively engaged with a locking member 167 through a pin 167' disposed in the slot 166. The locking member 167 is reciprocably mounted with the inner end adapted to enter a locking recess 168 formed in one side of the rotor disk 143. This recess has an approximately radial surface 169 extending all the way down to the depth of the recess 168 from the periphery of the rotor disk 143, and on the other side a parallel surface 170 of substantially smaller depth than the surface 169. Between the upper edge of the surface 170 and the periphery of the rotor 143 is disposed a gradual curve surface 171, the latter gradually merging into the periphery of the rotor disk 143. By this arrangement the inner end of the locking lug or member 167 is held against the rotating rotor 143 by means of a pair of springs 172, and the locking lug 167, instead of dropping to the lower part of the locking recess 168, strikes the curved surface 171.

The disc rotor 143 is provided on its periphery and centrally thereof with a groove 143' for accommodating a flange 142' which is fastened in any suitable manner to the casing 142 on the interior thereof and this flange forms a sealing side wall for the vanes 144 on one side, while one end of the casing 142 forms a sealing edge on the other side. Thus referring to Fig. 9 the upper part of the rotor disc 143 forms the fluid pressure part of the unit while the part of the rotor 143 below the flange 142' contains the recess 168 which cooperatively functions with the locking member 167 to lock and release the rotor 143 and thereby the rotating wing system.

The fluid pressure device 141 functions either as a motor or as a pump or compressor. In the position shown (Fig. 10) this fluid pressure device is functioning as a motor to start the rotating wing system from rest. The rotor disk 143 is coupled to the shaft 18 at all times and runs freely while the craft is operating as a rotating wing craft, taking air in through the chamber 149 and forcing it out through the chamber 147 and the exhaust pipe 161, the flap valve 162 being open.

When it is desired to convert from rotary to fixed wing operation, the fluid pressure device 141 is converted into a pump for filling the tank 140 with fluid pressure. This converting operation is initiated by closing the poppet valve 153 and closing the flap valve 162, whereupon the rotation of the rotor 143 takes in air through the chamber 149 past the swinging valve 151, which is now in the dotted line position, and exhausts the air through chambers 147, 160, and thence through the pipe 174, 174' into the storage tank 140. In the portion 174 of this pipe is disposed a one-way or check valve 175 which permits a pressure of air to be forced into the pipe section 174' but prevents backflow. The work done by the fluid pressure device 141 in storing air under pressure in the tank 140 is utilized for arresting, or assisting in the arresting, the rotation of the wing system. During this slowing up or braking operation, the inner end of the locking plunger 167 is riding upon the rotor 143, and, notwithstanding the pull of the spring 172, this locking plunger cannot fall into the locking recess 168 until the rotor comes to rest, since the plunger jumps the recess and falls upon the inclined or curved bearing surface 171 so long as the rotor has any appreciable speed. If the rotor should stop with the locking plunger 167 alined with the bottom of the recess 168, then the springs 172 would urge the plunger to the bottom of the recess, thereby locking the rotor 143 and the wing system. In this position the rotor wings are properly oriented for fixed wing operation. If the rotor comes to rest at a different position relatively to the plunger 167, then the fluid presure device 141 operates as a motor in reverse, and this reverse operation, indicated by the dotted arrow, continues with the locking plunger resting on the periphery of the rotor 143 until the inner end of the plunger 163 runs down the curved surface 171 and slips into the locking recess 168. The reverse operation of the fluid pressure device 141 is effected as follows. The pipe section 174' leads into a chamber 176, which chamber may be put in communication with chamber 160 through a poppet valve 177. The latter valve has a stem 177' which is guided through the walls of the chamber 176 in its opening and closing movements, and this stem is provided with a pin or lug 178 which is disposed in the path of the lever arm 164, whereby when the lever 164 is operated about the pivot 165 in a clockwise direction the poppet valve 177 is closed thereby. The valve stem 177' is pivotally fastened at its outer end at 179 to a pair of toggles 180; the other ends of these toggles 180 being provided with longitudinal slots 180' which accommodate fixed pins 181 carried by a pair of frame members 182 which are fastened to the walls of the chamber 176. The toggles 180 are biased by the toggle spring 183 in such a manner as to hold the valve 177 in its actuated position. As the rotor 143 slows up during the braking operation, the pressure in the chambers 147 and 160 gradually decreases, and when that pressure falls sufficiently below the pressure in the tank 140 the difference in pressure above and below the valve 177 operates the valve in an inward direction to open the same against the tension of the toggle spring 183, causing the toggles to collapse with the spring 183 occupying the position on the other side of the pivotal point 179. The valve 162 having been closed when the bell crank 158 is moved to the position for converting to fixed wing operation from rotary wing, the fluid pressure device is now connected up for reverse operation, with the pressure of the tank 140 being supplied through the pipe 174' to the chamber 176 and thence to the chambers 147 to operate to exert a force tending to rotate the rotor 143 counterclockwise (Fig. 10). After the opening of the valve 177 the braking operation is continued until a complete stop occurs, whereupon the reverse operation, as above indicated, takes place for a partial rotation of the rotor 143 to bring the plunger 167 into the locking and orienting recess 168. When this happens the springs 172 actuate the lever 164 about the pivot 165 clockwise through the pin slot connection 167', 166 to engage the pin 178 of the valve stem and reclose the valve.

As indicated, the flap valve 162 is operated by the arm 162' fastened to it and the arm 162' is pivotally connected to a link 163 at one end with the other end pivotally connected with the lever 164. The pipe 161 is provided with an enlarged chamber 161' for accommodating the flap valve 162 and this flap or wing valve remains closed during that part of the stroke of the locking member 167 between the periphery of the rotor 143 and the bottom of the recess 168, and the valve is opened and closed by that part of the movement of the member 167 between the point where it rests on the rotor 143 and the point where it is actuated by the bell crank 158 to its outermost position. The valve 177 is open only during the last portion of the arresting or alining operation, and the closure thereof retains the pressure remaining in tank 140 to be used in starting rotation of the wings when converting to rotary operation.

The bell crank 158 may be operated about the pivot 159 in any suitable manner, as for example by having the other arm of the bell crank lever operatively connected to a control link 425. The bell crank lever 158 and the link 425 occupy two positions; one position which is shown in full lines (Figs. 9 and 10) being the position just after initiating the starting operation for conversion from fixed wing to rotary wing. The other bell crank position is indicated in dotted line position (Fig. 9) which corresponds to the braking position of the fluid pressure device 141 for slowing the rotary wings down and arresting their rotation. The arm 158, moving from the dotted line position to the full line position (Fig. 9), engages a lug 186 formed on the plunger 167 to withdraw the plunger 167 from the locking recess 168.

Figures 7, 7A, 7B, 7C:
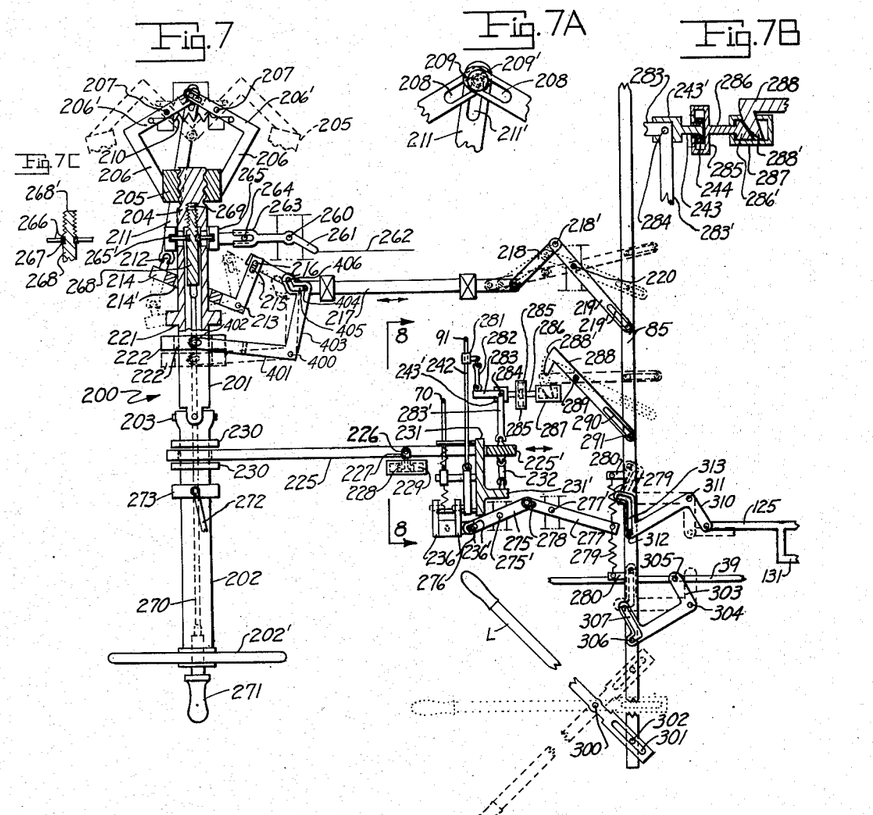
Fig. 7 is a diagrammatic view illustrating certain of the controls and converting means drawn along the line 7—7 of Fig. 8.
Figs. 7a and 7b illustrate details of the structure shown in Fig. 7.

The link 425 is operated by a link or arm 125' through a link pivoted at 314 to a fixed part of the frame, this link having a pin slot connection with the arm 125' and the link 425 and functioning to reverse the direction of movements of the two arms or links. The operating arm 125' for the bell crank 158 may be operated in any suitable manner but preferably by the unitary member 85 and associated means hereinafter described in Fig. 7. Fig. 7 shows the hook-up for operating the arm 125 and 131 described above with respect to the modification of Figs. 4, 5A and 5B and it is understood that when the embodiment of the starting, braking and locking means of Figs. 9 and 10 is employed, the arm 125' is operatively connected with the member 85 similarly to the connections of the arm 125 to the member 85. The fluid pressure starting and braking device 141 is illustrated in the embodiment of Fig. 9. In this embodiment the rotor rings 2' and 3' are of the same length and are operated at the same speed. The spur gear 190 is carried by a stub shaft 191, this stub shaft being mounted in bearings in any suitable manner. One end of the stub shaft 191 carries a beveled gear 192 which meshes with larger beveled gears 193 and 194, the former being coupled to the shaft 15, as by being keyed thereto, and the latter, namely 194, being keyed to the shaft 18, the gears 193 and 194 being of the same diameter to rotate the rotor wings 2' and 3' at the same speed.

The controls of the rotor wings 2' and 3' are omitted from the schematic illustration of Fig. 9 for convenience in illustration, but it is understood that any suitable controls may be employed, and it is intended to employ the control shown in Figs. 4, 5 and 6 for controlling these rotating wings with the wings 2' having the controls identical with those described with respect to the rotating wing 2, and the controls of the rotating wing 3' being identical with those described for the rotating wing 3.

Figure 8:
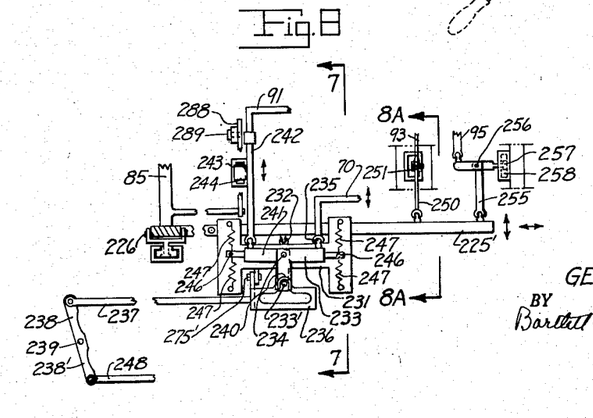
Figs. 8 and 8a diagrammatically illustrate certain features of the controls.
Figure 8A:
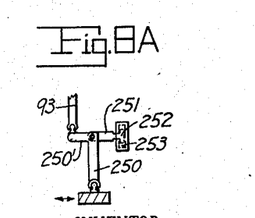

The various controls above described may be manipulated and operated by any suitable means, and I have shown schematically in Figs. 7 and 8 a simple means for this purpose, and also means whereby the pilot may operate and initiate the operation of the various controls in the desired order and sequence for effecting safe conversion while in the air from either of the types of possible operations to the other.

This means comprises (referring to Fig. 7) a depending manual control 200 having an upper part 201 and a lower part 202 which are connected to each other by universal joint 203 permitting the lower part 202 to swing in all directions about the universal joint. The upper part is provided with a reacting and non-reacting member which may comprise an exterior screw thread 204 which cooperatively functions with an internally threaded nut 205, the latter when in the operative position being fixed against movement. The screw threaded nut member 205 is divided into two parts which are carried by the angle pieces 206. The upper parts 206' of these angle pieces 206 are pivotally fastened to fixed parts of the frame at 207 and their ends are provided with slots 208 for the accommodation of a fastening pin 209 which is loosely held in the slots by the heads 209'. The arms 206' form toggles which are held in the actuated positions by a spring 210 which is fastened at either end to the arms 206' at points removed from the fixed pivotal points 207. In the full line position the upper end of the manual member 201 is in screw threaded adjustable relation with the screw threaded nut 205. In the dotted position, the toggles 206' are actuated to a position where the halves of the split nut 205 are out of engagement with the screw threaded end 204 of the manual member. This actuation is effected by means of a link 211 which is provided with a slot 211' at its upper end, which is also traversed by the fastening pin 209 which holds the three elements in assembled relation. The lower end of the link 211 is fastened by universal joint 212 to one arm 214 of a bell crank lever pivotally fastened to a fixed point of the frame at 213 while the other arm of the bell crank is provided with a slot 215 for accommodating an actuating pin 216 on the end of a reciprocating rod 217. The other end of the reciprocating rod 217 is pivotally attached to a link 218 which in turn is pivotally fastened at 218' to a lever 219 which is pivotally fastened to a fixed point of the frame at 220. The lever 219 is provided with a slot 219' which is in operative engagement with the control shaft 85 through a pin carried by the shaft 85 and disposed in the slot 219'. The arm 214 of the bell crank lever is provided with a recess or opening 214' through which passes the manual element 201. The manual member 201 is provided with a collar 221 which is disposed below the actuating arm 214 and is engaged thereby to forcibly pull the manual member 201 down to the limit of the downward movement of the member 201 as determined by the limiting stop 222.

This limiting stop 222 is carried by a bell crank lever pivoted to a fixed point of the frame at 400, this bell crank having one arm 401 forked and pivoted to the opposite sides of the limiting stop 222 as indicated at 402. The other arm 403 of the bell crank is operatively connected with the reciprocating member 217 through a pin slot connection, the pin 404 being carried by the member 217. The slot part of the connection is on the bell crank arm 403 and this slot has a horizontal portion 405 providing a movement of the rod 217 to disengage the threaded nut 205 without actuating the bell crank to shift the stop 222. The other part of the slot is indicated at 406 and is disposed at an angle to the part 405 so that by further movement of the member 217, as from gyro operation to fixed plane operation, the stop 222 is lowered to the dotted position shown.

The lower part 202 of the manual device effects through the screw threaded adjustment 204, 205 the actuation of the vertical lift controls of the upper and lower rotating wings. This is effected by a lever 225 which is pivoted at 226 to a bracket 227 which is journaled to a slide 228 guided by guideways 229 disposed generally in the direction parallel to the lever 225, the guideways 229 being fixed against movement. This lever 225 is operatively connected at its left-hand end with the control member 202 through a universal connection 230 comprising a pair of spaced collars 230 between which the end of the lever 225 is disposed, the end of the lever 225 having a sufficiently loose connection with the collars 230 to permit the up and down movements of the lever with respect to the pivot 226. The end of the lever 225 is provided with an opening through which passes the manual member 202 permitting free rotation of the manual member 202 to move that end of the lever 225 in vertical planes about the pivot 226. As above described, the operating connection for the vertical lift control of the upper rotor wing 2 comprises a connection 70 and the operating connection for the vertical lift control of the lower wing comprises a connection 91. The lever 225 is provided with a right-angular part 225' on the opposite side of the pivot 226 from the manual member 202 and this part of the lever is operatively connected with the connections 70 and 91 as follows.

An I-shaped block 231 is suspended from the lever 225 by means of a link 232 having universal connections with the lever 225' on one end and a similar connection with a projecting lug or flange 231' forming a part of the block 231. Pivotally mounted on one side of the suspended block 231 is a bell crank 233 being pivotally fastened at 234 and one arm of this bell crank is provided with a universal connection 235 with control connection 70 for the vertical control of the upper wing. The other arm of this bell crank 233 is disposed at right angles thereto and extends downwardly where it is operatively connected with one side of the bifurcated reciprocating yoke member 236, the latter being rigidly connected with a reciprocating rod 237 which in turn is reciprocated back and forth by a lever 238 pivotally mounted at 239 with its lower end 238' forming a foot pedal. The operative connection between the bell crank 233 and the yoke member 236 is a pin 233' carried by the bell crank and located in an open ended slot formed in an upwardly projecting ear 240 from the yoke member 236. The operating connection 91 for the vertical control of the lower wing 3 is similarly connected with one side of the bifurcated yoke member 236 through a bell crank 241 pivoted for movements about the pin 234 carried by the block 231, the bell crank 241 having a universal connection with the arm 242 extending upwardly and coupled with the connection 91. The other arm of the bell crank 241 is connected with one of the bifurcated members of the yoke 236 similarly to the connection of the bell crank 233. The link 242 is pivotally fastened to a bracket 243 swiveled to a slide 244 moving in a fixed guideway 285 extending generally parallel with the link 242.

Thus by rotating the manual control 201, 202 through the wheel 202' the lefthand end of the lever 225 may be moved up and down to operate the vertical lift controls 70 and 91 which changes the angles of the wing halves of either rotor in equal amounts for helicopter operation. The angles for vertical lift assumed by one of the rotor wings may be equal to those of the other rotor but in the particular embodiment of Fig. 1 wherein the lower rotor wing 3 operates at a greater speed than that of the upper rotor wing 2, I have indicated the vertical lift angles for the upper wing as being somewhat greater than the angles for vertical lift of the lower wing 3. In the case of the embodiment of Fig. 9 where the upper and lower rotor wings are of the same span and operate at the same speed, it may be desirable to have the angles for vertical lift of the lower rotor wing somewhat greater than the angles of the upper wing due to the interference with the efficiency of the lower wing. These vertical lift controls are effected solely by the up and down manipulation of the lever 225 about its pivot 226.

It may be desirable to vary the vertical lift controls of the two wings reversely with respect to each other, that is decreasing the vertical lift angles of one rotor while increasing the angles of the other. Thus for any setting of the lever 225 in vertical planes about the pivot 226, the pilot may effect this differential control through the manual operating lever 238, for example, by utilizing this lever as a foot pedal, that is by reciprocating the yoke 236 to the right and left (Fig. 8). The bell cranks 233 and 241 are operated reversely about the pivot 234 to differentially vary the lift angles of either wing with respect to the other, namely the lift angle of either of the wings may be decreased while the lift angle of the other wing is increased. The bell crank arms 233 and 241 are provided with extensions 246 which are yieldingly biased to a neutral position by the spring 247 which are attached at their outer ends to the suspended block 231 and at their inner ends to the extensions 246. This differential variation of the lift angles of the two rotor wings supplements the rudder operation in effecting differential control. The same pedal 238' may be used for operating both the rudder and differentially varying the lift angles of the two rotors. The rudder 9 is connected with the pedal 238' by means of a rod 248.

The periodic controls which in the embodiment herein shown are only included in the lower rotor wing, are operated by the swinging movements of the manual member 202 about the universal joint 203. For example, by swinging the manual member 202 longitudinally of the lever 225 the periodic control member 93 for the lower wing 3 is operated. This is effected through a bell crank, one arm 250 of which is universally connected with the lever 225' at its free end and pivotally connected with a bracket 251 swiveled to a slide 252 guided in a guideway 253 of the fixed member. The other arm 250' of the bell crank is operatively connected with the link 93 which operates that periodic control.

The other periodic control which is operated through the link connection 95 is effected when the manual member 202 is swung about the universal 203 in a plane vertical to the paper with the bracket 227 swiveling about the slide 228. This operating connection includes a bell crank, one arm 255 of which has a universal connection with the lever 225' with the bell crank being pivoted at 256 to a bracket swiveled in a slide 257 movable in a fixed guideway 258 disposed substantially at right angles to the lever 225', thus these particular swinging movements of the lever 225 result in the right-angular part 225' of the lever moving in the direction of its length. The other arm of the bell crank lever is operatively connected with the connecting link 95 for effecting the other periodic control.

Combinations of these various controls may be effected simultaneously by the manipulation of the manual member 202. For example, by swinging the member 202 about the universal 203 to impart components of movement to lever 225 lengthwise thereof and at angles thereto, both the periodic controls, links 93 and 95 are simultaneously proportionately effected, and by simultaneously turning the wheel 202' to impart components of movement to the lever 225 in vertical planes, the lift controls of the two rotor wings may be simultaneously effected.

When the vertical lift controls 70 and 91 are operated by the control member 225' to vary the vertical lift controls of the upper and lower wings the periodic control members 93 and 95 are simultaneously lifted or lowered by the control member 225' and proportionately to the operation of the control member 91, so that the setting of the controls 93 and 95 is not effected by the mere up-and-down movement of the control member 225'. Thus the operation of the control member 91 for varying the vertical control of the lower wing does not appreciably change the setting of the periodic controls although of course as pointed out above either or both of the periodic controls effected by the members 93 and 95 may be simultaneously changed by the corresponding movement or movements of the control member 225' to bring this about. Thus the ring control unit of Figs. 5 and 6 is lifted as a unit to vary the vertical lift of the lower wing without either interfering with the previous periodic control settings or with their independent simultaneous operation. This operation is clear from Figs. 7, 8 and 8A which show that the up-and-down movements of the control member 225' merely operate the bell crank units 250 and 255 to lift or lower longitudinally the control members 93 and 95 respectively, the slides 252 and 257 merely moving in the respective fixed guide paths 253 and 258. The bracket 251 to which the bell crank lever 250 is pivotally fastened and the bracket to which the bell crank lever 255 is similarly pivotally fastened are swivelly mounted with respect to their respective guide paths so as not to interfere with the movements of the control member 225' necessary to change the periodic controls (93 and 95) and this swivelling construction may be similar to the construction of the bracket 227 swivelled in the slide 228 which moves back and forth in the guide 229. The range of angular movements of the bell cranks 250 and 255 about their pivotal fastenings to their corresponding brackets and the swivelling movements with respect to the fixed guides 253 and 258 are not large enough to interfere with the bodily lifting and lowering of the periodic control members 93 and 95 by the up-and-down movements of the control member 225'.

Referring to Fig. 7, a throttle control for the power plant driving the rotor wings in helicopter operation is combined with the manual member 202 to facilitate the operation of this manual control by the pilot. This includes a bell crank pivoted to a fixed part of the frame at 260, one arm 261 of which is fastened to the throttle control rod 262. The other end of the bell crank is formed into a fork 263 which straddles a pin 264 carried by an arm of a vertically adjustable collar 265 surrounding the manual member 201. The manual member 201 is provided with vertical slots for guiding a pair of pins 266, the outer ends of which traverse a groove 265' formed on the inner surface of the collar 265 with their inner ends disposed in an annular groove 267 formed in a vertically adjustable member 268. The latter is disposed within the manual member 201 and is provided at its upper end with a screw threaded part 268' cooperatively functioning with a screw threaded recess 269 formed in the upper end of the manual member 201. Thus by rotating the screw threaded member 268 the collar 265 may be moved up and down to actuate through the bell crank the throttle control 262. In the particular embodiment shown this vertically adjustable member 268 is rotated by a flexible torque transmitting cable 270 fastened upwardly through the manual member 202, the universal joint 203 and the hollow member 201 and firmly fastened to the lower end of the adjustable member 268. The lower end of the torque transmitting cable 270 has attached thereto an operating handle 271 whereby the pilot may conveniently rotate the cable to operate the throttle control 261.

Thus the manipulation and operation of the rotor wing controls are under the control of the manual device 201, 202, the periodic controls being manipulated by the universal movements of 202 and the vertical lift controls being manipulated by the rotation of the wheel 202'. Likewise the throttle control for the engine may be manipulated by the handle 271 forming a part of the single manual device 202, 201.

The elevator 7 is also manipulated by the manual device 202 through an operating connection or rod 272 which is fastened by a universal joint at one end to a collar 273 journaled in a recess formed on the outside of the manual member 202 for free relative rotation with respect thereto. The other end of the connection 272 is fastened in any suitable manner to the elevator 7, as, for example, to a horn 7'. Thus assuming swinging movements of the manual member 202 in a plane vertical of the paper to effect ascending or descending control, the operating connection 272 is hooked up with the elevator 7 so as to be manipulated during such swinging movements, as, for example, to assist in periodic control thus manipulated.

The position illustrated in full lines in Figs. 7 and 8 as above described corresponds to helicopter operation. In converting from helicopter operation to gyro operation, the following changes are effected. The control member 217 (Fig. 7) is moved toward the left to release the nut adjustment 205 from the upper end 204 of the manual member 201, the toggle levers 206 carrying the split nut 205 being actuated thereby to the broken line position. This drops the manual member 201, 202 to a position where the collar 221 rests upon the limiting stop frame member 222. This throws out of operation the vertical lift controls of the rotor wings by the manual member 201, 202. The release of the upper end of the manual member 201 by the adjusting nut 205 permits the manual member to drop but if it should for some reason not drop the bell crank 214 pivoted at 213 forcibly engages the collar 221 to force it down upon the limiting stop 222. At the same time it is desirable to render inoperative the vertical lift controls by the pedal 238'. This is effected by lifting the bifurcated unit 236 to disengage the pin slot 233', 240 from the operating connection with the bell crank levers 233 and 241. For effecting this disengagement the lever 275 pivoted to a fixed part of the frame at 275' is operatively connected with the unit 236 through a pin 236' carried by the unit 236 and a slot 276 formed in one end of the lever. By rocking this lever clockwise the unit 236 is bodily lifted to effect this disengagement between the pedal control for the vertical lift controls of the rotor wings. In the particular embodiment shown the lever 275 is operated by a lever 277 pivotally fastened at 277' to a fixed part of the frame and having a slot 278 at one end in engagement with the pin on the end of the lever 275. The other end of the lever 277 is operatively connected with the control rod or member 85 through a pair of springs 279 which are fastened at their inner ends to the end of the lever 277 and at their outer ends to lugs 280 carried by the rod 85.

In converting from helicopter to gyro operation it may be desirable to change the throttle of the power plant 12 and by the arrangement shown in Fig. 7 the throttle control lever 261 is operated when the manual member 201 is dropped upon the limiting stop 222 as, for example, to decrease the power supplied to the engine.

It is also desirable to uncouple the rotating wings from the drive shaft 25 and this is effected by operating the clutch control member 39. This control member 39 is also connected with any conventional variable pitch mechanism so as to increase the traction of the traction propeller 11 upon uncoupling the clutch 36, 37 in converting from helicopter operation to gyro operation.

With the craft operating as a gyro, the manual control member 202 is operated to manipulate the periodic controls and the elevator and the throttle may be manipulated by the conveniently mounted handle 271. Likewise, the rudder 9 may be manipulated by the pedal 238'.

In the operation of the craft as a fixed wing type I utilize the adjustment of the wing halves to control or assist in controlling flight and in the particular embodiment shown I utilize the adjustment of the wing halves both to effect lateral control and to assist in controlling the elevation. The adjustment of the wing halves of both wings may be utilized for this purpose but in the embodiment shown herein I utilize the vertical controls and the periodic controls of the lower wing for fixed plane control, or control in fixed wing operation, namely I have provided for the utilization of the vertical lift control of the lower wing for both vertical lift control during helicopter flight and for lateral control during fixed wing type of operation, and the periodic controls are utilized as described above for gyro operation and also for elevational control for fixed wing type of operation thereby simplifying the control mechanism of the craft.

Figures 1, 1A, 1B, 2:
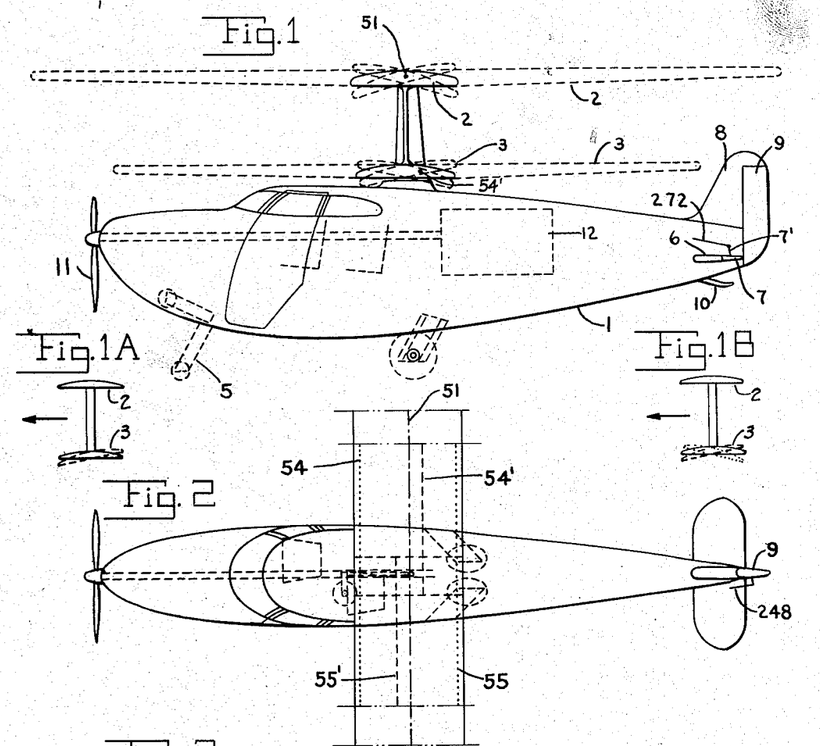
Fig. 1 is a side view diagrammatically illustrating an aircraft embodying the invention.
Figs. 1a and 1b are diagrammatic views illustrating certain features of the controls.
Fig. 2 is a plan view thereof.

Figs. 1A and 1B show schematically the adjustments of the lower wing 3, 3' for assisting in the elevational control and for obtaining lateral control respectively.

The elevational control for fixed wing operation is effected through the manipulation of the connection 95 leading to one of the periodic controls of the lower wing. That is, when the manual member 202 is swung in planes at right angles to the lever 225 this adjusts the wing halves of the lower wing in the same direction as shown in Fig. 1A to assist the elevational control effected by the rod 272 through similar movements of the manual member 202. This is effected through the operation of the control 95 which tilts the control rings about the axis 87, 87 thereby depressing the trailing edge of one wing half and raising the leading edge of the other wing half, effecting movement of both wing halves in the same direction.

The lateral control for fixed wing operation, which is wholly effected through the differential adjustments of the wing halves of the lower wing, is effected through the manipulation of the operating connection 91. The swinging movement of the manual member 202 in the plane of the drawing effects this operation.

The operative connection between the manual member 202 and the connection 91 includes a bracket 281 fixed to the operating rod 242, a link 282 having universal connections at one end with the bracket 281 and at the other end with a bell crank lever 283 which is pivotally fastened at 284 to an extension 243' of the bracket 243 which is swivelled to the slide 244. The other arm 283' of the bell crank lever has a universal connection with the part 225' of the lever 225, so that when the lever 225' is moved to the right and left in Fig. 7 the bell crank 283, 283' is operated to operate the connection 91 and thereby the wing halves of the lower wing to effect the lateral control of the craft for fixed wing operation.

The slide 244 is guided in an elongated guide for sliding movements relatively to the guide 285 in one direction, and the guide 285 is carried by a supporting member 286 which is slidable in a guide 287 in a direction at right angles to the guide 285. A lever 288 pivoted at 289 to a fixed part of the frame has a locking lug 288' which passes down through an opening of the guide 287 to lock the member 286 against sliding movement in the guide 287. The other end of the lever 288 is provided with a slot 290 which accommodates a pin 291 on the rod or shaft 85 for operation by the shaft or rod 85. When the locking lever 288 is out of engagement with the member 286, 286' the operation of the bell crank 283, 283' does not effect operation of the rod or link 242 because the pivot 284 is not fixed, due to the sliding of the slide member 286. This is shown more in detail in Fig. 7B. During fixed wing operation the yoke 236 remains out of operative engagement with the bell cranks 233 and 241, and the wing halves of the upper wing are fixed against adjustment. The operative connection 93 is operated during fixed wing operation, but such manipulation merely means the tilting of the ring about the axes of the operative connections 79 of the wing half so that no adjustment takes place.

The conversion from gyro operation to fixed wing operation includes the above described control of the starting motors to act as a brake for slowing up or expediting the slowing up and arrest of the wing with the wings being brought to rest, oriented and locked in the orienting position for fixed wing operation. With the wings locked and oriented in position, the pilot sets his throttle by manipulating the handle 271 to obtain the required traction and, if deemed advisable, he may also adjust the pitch control of the propeller 11, any conventional manual adjustment of said pitch being employed and omitted from the drawing for convenience in illustration.

The conversions in the reverse direction, namely, from fixed wing operation to gyro and then to helicopter, are obvious from the above description, and either or all of these conversions may be safely made while the craft is in flight.

Another important feature of the invention is the provision of a single conversion control means, namely, a shaft or rod 85, by the manipulation of which the conversion controls are initiated and operated in the order desired to effect quick and safe conversions. This rod 85 is reciprocated by a lever L pivotally mounted at 300 to a fixed part of the frame. This lever on one end is provided with an elongated slot 301 which engages a pin 302 on the rod 85 and moves it through an angle indicated in Fig. 7 between the full line position and the broken line. With the lever L in the full line position the plane is operating as a helicopter. When it is desired to convert from helicopter to a gyro, the lever L is moved downward to the position indicated in dotted lines, namely, through an angle approximately one-half the whole range. This operation moves the rod 85 upwardly which operates the lever 219, the link 218, the shaft 217, the bell crank 214 and the link 211 to actuate the toggles from the full line position to the dotted line position, whereby the adjusting nut 205 is swung upwardly to release the manual member 201, 202, permitting the latter to drop by gravity with the collar 221 resting upon the limiting stop 222. If it does not drop by gravity the bell crank 214 engages the collar 221 and forces it downwardly. This downward movement also, as described above, operates the bell crank 261 to adjust the throttle of the engine to the desired power output of the engine corresponding to gyro operation. This movement of the rod 85 also operates the connection 39 to disengage the power clutch 36, 37 and simultaneously to change the pitch of the propeller 11 for the desired traction while operating as a gyro. This operation of the connection 39 is connected through a bell crank 303 pivotally fixed to the frame at 304 and having a pivotal connection with the connection 39 at 305. The other arm of the bell crank lever 303 has a pivotal driving connection with the rod 85 through a pin 306 carried by the latter. This driving connection is only operative during the first half of the movement of the lever L which results in the actuation of the bell crank 303 to the dash line position. In that position the pin 306 is disposed in a slot 307 formed in an arm disposed at right angles to the arm of the bell crank. The movement of the shaft 85 also actuates the lever 217 to lift the bifurcated yoke 236 out of operative engagement with the bell cranks 233 and 241, thereby rendering inoperative the vertical lift controls for both the upper and lower wing for gyro operation—that is, through the pedal 238' they are also rendered inoperative. These vertical lift controls are also rendered inoperative by the dropping of the manual control member 201, 202 with the collar 221 resting on the limiting stop 222, and when this manual member drops to the lower position the vertical lift control for the upper wing is not only rendered inoperative but operated during this operation to bring the wing halves of the upper wing into a predetermined position. The vertical lift control of the lower wing is also neutralized except for any adjustment due to the operation of either of the periodic controls.

In converting from gyro operation to fixed wing operation the lever L is moved down to the dash position shown, with the corresponding completion of the upward movement of the shaft 85. This latter movement of the shaft 85 operates the lever 219 to the dash position and pushes the shaft 217 further to the left, thereby operating the operating lever 214 about the bell crank lever 213 and the link 211, but this merely retains the toggle arms 206 in the position shown in dash lines. This further movement of the shaft 217 operates the bell crank 403 through the pin-slot drive 404—406 to lower the stop collar 222 to the dash position shown for fixed wing operation.

This further movement of the shaft 85 also operates the lever 288 to the position shown in dash lines to lock the slide member 286 against movement, thereby permitting operation of the connection 91 to adjust differentially the wing halves of the lower wing for lateral control for wing operation, as described above.

This latter half of the movement of the lever L also operates the operating connection 125 to release the means holding the lock out of engagement with the shaft 18, namely, releasing the lever 105 of Fig. 5A and Fig. 5B in the embodiment shown therein or the holding lever 158 in the embodiment of Figs. 9 and 10. This operation of the connection 125 is effected through a bell crank 310 pivotally fastened to a fixed part of the frame 311 with one arm of the bell crank being pivotally fastened to the connection 125 and the other arm of the bell crank having operative connection with a pin 312 carried by the shaft 85. This particular arm of the bell crank 310 is provided with an arm 313 disposed substantially at right angles thereto and having a slot longitudinally of the arm 313 to prevent movement of the bell crank during the movement of the shaft 85 for conversion from helicopter to gyro.

The movement of the shaft 85 for conversion to fixed plane operation also operates the control member 131 to engage the control finger 135' for changing the connections of the motor 44 to cause the latter to function as a brake, as described above for slowing down the rotating system (Fig. 4). This is shown as operated from the operating connection 125 which is fastened to the control 131 (Fig. 7). In the case of the embodiment of Figs. 9 and 10 the operating lever 131 would be omitted. The latter half of the movement of the shaft 85 in converting to fixed wing operation also results in the operation of the lever 288 to lock the slide 286 so as to provide for the operation of the connection 91 by the lateral control for fixed wing operation, as described above. With either the embodiment of the electric motor, starter and brake of Fig. 4, or the fluid pressure starter and brake of Figs. 9 and 10, the braking and slowing up of the rotating system is entirely automatic with the orienting and locking members automatically functioning to orient and lock the wings in the orienting position with no other manual manipulation than the shaft 85 to initiate these operations.

In converting from gyro operation to fixed wing operation the full line position of the limiting stop 222 shown in Fig. 7 determines the gyro setting angle of incidence for the wing halves. This arrangement is used when it is desired that the gyro setting of the wing halves shall be different from the airplane setting of the wing halves. That is, the dash line position of the limiting stop 222 determines the position of the vertical control means for fixed plane operation. By these two different positions of the limiting stop 222, one for gyro and the other for fixed plane operation, I am enabled to predetermine the best settings for each type of operation.

For safety in conversion it is preferable that the lever L be incapable of occupying any other than one of the three positions corresponding to fixed plane, gyro and helicopter operations respectively; namely, that the movements of lever L may be arranged such that if moved for starting a phase of conversion and released, it will continue to complete the movement for that particular conversion, for example, from plane to gyro. When once started in its appropriate movement if released, this movement will continue until the movement for that particular phase of conversion is completed, as in this case to gyro and further when once started in the movement from gyro to helicopter it will automatically complete this movement. Furthermore, in the reverse conversion the same action may be arranged for, the object being to make the operation of lever L more fool-proof. Any suitable means may be provided for this purpose and is omitted for convenience in illustration.

Figures 11, 11A:
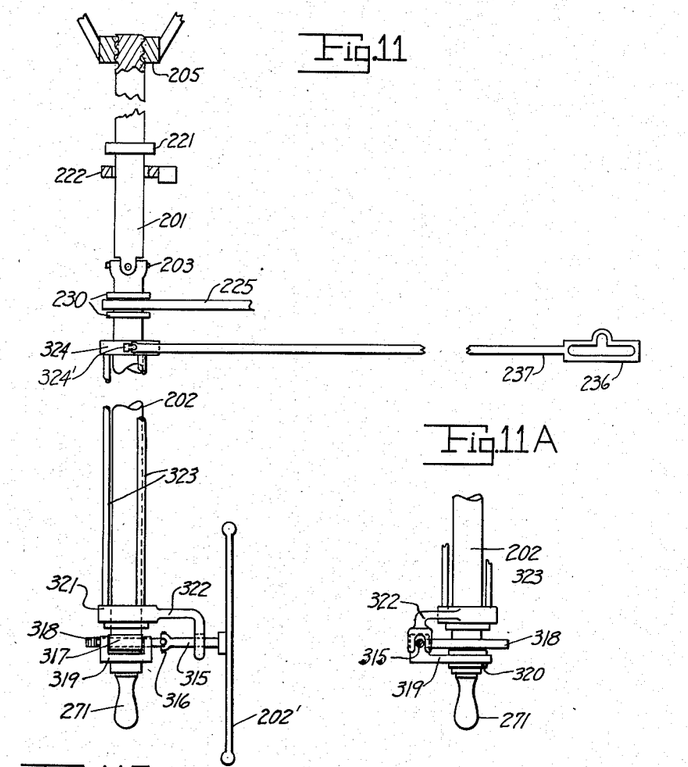
Fig. 11 illustrates diagrammatically the modification of a part of the control shown in Fig. 7.
Figs. 11a and 11b illustrate parts of the structure shown in Fig. 11.
Figure 11B:
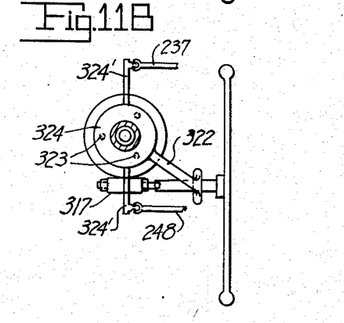

In the embodiment of Figs. 11 to 11B, I have shown a modification of the controls shown in Figs. 7 and 8 whereby the foot control is eliminated and all of the controls embodied in a single manual control. The manual member 202 is still rotated about its axis by means of a wheel 202' for adjusting the vertical lift controls, except that here the wheel 202' is mounted on a counter shaft 315. This shaft 315 has a torque transmitting universal connection 316 with a worm gear 317 which is enmeshed with another worm gear 318 which is keyed to the manual member 202. The worm 317 is journaled in a bracket 319 carried by a collar 320 surrounding the manual member 202 and journaled therein for relative rotation but fixed against relative longitudinal movements. The shaft 315 is supported in part by the universal joint 316 and the bracket 319, and in part by a collar 320, 321 surrounding the member 202 and carrying a right angle arm 322 through one arm of which the shaft 315 is journaled. The collar 321 in turn is supported by rods 323 extending upwardly and fastened at their upper ends to a collar 324 journaled about the manual member 202 for rotation thereabout but fixed against relative longitudinal movement. The collar 324 is connected on one side with an operating link 237 for operating the bifurcated yoke 236, this connection between the link 237 and the collar 324 being by means of a lug 324'. This connection is a universal connection. On the opposite side of the collar is disposed a similar lug 324' which is universally connected with the link 248 for operating the rudder. Thus by rotating the wheel 202', the manual member 201, 202 is rotated for adjustment of the vertical lift controls. For rudder control and operation of the connections 70 and 91 through the yoke 236, the wheel mount unit, including the shaft 315, the arm 322, the collar 321 and the collar 324 may be rotated through the required angle about the universal joint 316 in either direction, thereby eliminating the necessity for the foot control shown in Fig. 8.

Figures 3, 3A:
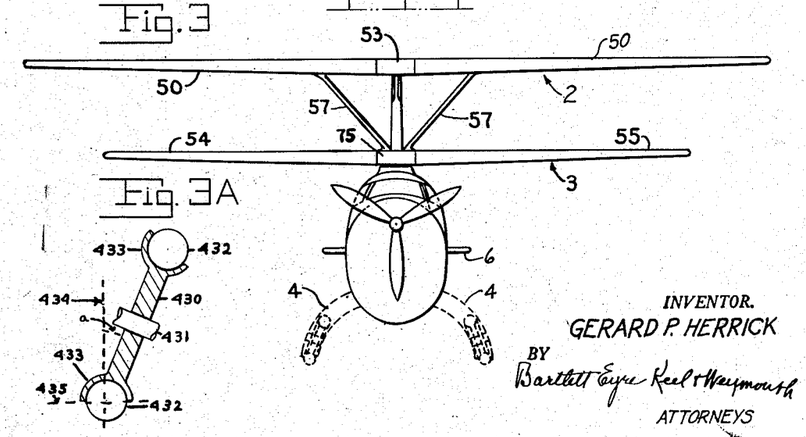
Fig. 3 is a front view thereof.
Fig. 3A is an enlarged view of a landing gear element.

In Fig. 3A I have illustrated a new and improved landing gear comprising a wheel 430 and an axle 431 with the wheel 430 in its ground-engaging position inclined to the vertical. The tires are indicated at 432 and the wheels are provided with rims 433 which are fastened to the peripheries of the wheels in planes which are offset from the plane of the wheels by angles $a$ equal to the inclination of the wheels to the vertical plane indicated by the dot and dash line 434. By means of this construction the tires which otherwise would tend to be forced out of the rims, will be retained therein against the load.

I claim:

1. In an aircraft, a convertible lifting surface operable either as a fixed surface or a rotating surface, means for locking the surface against rotation, rotor controls, multiple means for converting said surface from fixed operation to rotating operation comprising means for releasing the locking means to permit rotation of the surface, means for starting the surface in rotation, means rendering operative the rotor controls and a single control element operatively connected with said multiple means and coordinating the converting operations.

2. In an aircraft, a convertible lifting surface operable either as a fixed surface or a rotating surface, multiple means for converting said surface from a rotating to a fixed surface comprising means for arresting the rotation of the surface, means for orienting the surface for fixed operation and locking the surface in its fixed oriented position and a single control element which is operatively associated with said multiple converting means and determines the times of their operation.

3. In an aircraft, an airfoil lifting surface mounted for operation either as a fixed surface wing, a gyro or as a helicopter, said airfoil surface having portions variable in angles of incidence, means for varying the angles of incidence equally, means for varying the angles of incidence periodically, a transmission including a clutch for transmitting rotary power to said airfoil surface, means for locking said surface against rotary movements, and conversion control means controlling said several means and movable in one direction to convert the craft from a helicopter to a gyro and then to a fixed airfoil craft, and movable in another direction to convert the craft from a fixed airfoil plane to a gyro and then to a helicopter.

4. In an aircraft, a convertible lifting surface operable either as a fixed surface or a rotating surface and having controls for varying its angle of incidence relatively to the plane of rotation, means for neutralizing said controls, multiple means for converting said surface from a rotating to a fixed surface comprising means for arresting the rotation of the surface, means for orienting the surface and locking the surface in its fixed oriented position for fixed operation and a single control element which is operatively associated with said controls and said multiple converting means for neutralizing said controls and determining the times of operation of said multiple converting means.

5. In an aircraft, an airfoil lifting surface mounted for operation either as a fixed surface, a gyro or a helicopter, said airfoil surface having portions variable in angles of incidence, means for varying the angles of incidence equally, means for varying the angles of incidence periodically, means operating said portions for fixed operation control, multiple means for converting the craft from a helicopter to a fixed surface operation and a single element operatively connected with said means and under the control of the pilot for converting from helicopter to fixed surface operation which neutralizes the means for varying the angles of incidence equally, neutralizes the means for varying the angles of incidence periodically, renders operative the fixed operation control means operating said portions and operating in the desired order the other conversion means.

6. In an aircraft, an airfoil lifting surface mounted for operation either as a fixed surface, a gyro or as a helicopter, said surfaces having portions variable in angles of incidence, means for varying the angles of incidence equally, means for varying the angles of incidence periodically, a transmission including a clutch for transmitting rotary power to said airfoil surfaces, means for arresting the rotation of said surfaces and orienting and locking the same against rotary movements in the oriented position, a traction propeller and means for varying its pitch, a power plant and a throttle control and a single element under the control of the pilot controlling said several means and operative in one direction to convert the craft from helicopter to gyro and then to fixed surface operation which first neutralizes the means for varying the angles of incidence equally, increases the propeller pitch and decreases the throttle, and then arrests, orients and locks the rotating surfaces for fixed operation.

7. In an aircraft, a pair of convertible lifting surfaces operable either as fixed surfaces or rotating surfaces rotating in opposite directions, a control for each of said surfaces for controlling the lift, a control for periodically varying the angle of incidence of at least one of said surfaces while operating as a rotating surface craft, a traction propeller of variable pitch, a power plant for driving said rotating surface and said propeller, means for varying the propeller pitch, a clutch for coupling the power plant to the rotating surfaces, means for arresting, orienting and locking the surfaces for fixed operation and converting the craft from a helicopter to fixed surface operation comprising a single element under the control of the pilot which is operatively connected with said controls and converting means for first disengaging the rotating surfaces from the power plant and neutralizing the vertical lift controls and then neutralizing the periodical incidence controls and arresting, orienting and locking the surfaces in the fixed wing position.

8. In an aircraft, a pair of convertible lifting surfaces operable either as a gyro or helicopter and rotating in opposite directions, each of said lifting surfaces having portions variable in angles of incidence, means for varying the portions of one surface equally, means for varying the portions of the other surface both equally and periodically, a traction propeller, a power plant for driving said traction propeller and said rotating surfaces, means for varying the throttle of the power plant, a clutch control between the rotating surfaces and the power plant and conversion means for said craft comprising means for controlling the clutch and the power plant and neutralizing and rendering operative the controls for varying the portions of the surfaces equally upon conversion from one type of rotary operation to the other.

9. In an aircraft, a pair of convertible lifting surfaces operable either as fixed surfaces or as rotating surfaces, rotating in opposite directions, each of said surfaces having portions variable in angles of incidence, means for varying the variable incidence portions of one of said surfaces equally, means for varying the portions of the other of said surfaces both equally and periodically, means for neutralizing the controls for varying portions of the surfaces equally upon conversion from helicopter to gyro operation, a traction propeller, a power plant for driving the traction propeller and rotating said surfaces and means for converting said craft from one type of operation to the other while in the air.

10. In an aircraft, a pair of convertible lifting surfaces operable either as fixed surfaces or as rotating surfaces, rotating in opposite directions, each of said surfaces having portions variable in angles of incidence, means for varying the variable incidence portions of one of said surfaces equally, means for varying the portions of the other of said surfaces both equally and periodically, means for neutralizing the controls for varying portions of the surfaces equally upon conversion from helicopter to gyro operation, a traction propeller, a power plant for driving the traction propeller and rotating said surfaces and means for converting said craft from one type of operation to the other while in the air including means for arresting the rotation, orienting and locking said rotating surfaces for fixed operation.

11. In an aircraft, a convertible lifting surface operable either as a driven rotating surface or as an autorotative surface and control means for varying its angle of incidence to its plane of rotation for controlling its lift, traction means, means for conversion from one type of operation to the other, and means responsive to the last-mentioned means for varying the aircraft traction pull when changing from operation as a driven rotating surface to operation as an auto-rotative surface and from operation as an auto-rotative surface to operation as a driven rotating surface.

12. In an aircraft, a convertible lifting surface operable either as a fixed wing surface or as a rotating wing surface and control means for varying its angle of incidence to its plane of rotation for controlling its lift, traction means, means for conversion from one type of operation to the other, and means responsive to the last-mentioned means for varying the aircraft traction pull when changing from a rotating surface to a fixed wing and from a fixed wing to a rotating surface.

13. In an aircraft, a convertible lifting surface operable either as a fixed wing surface or as rotating surface, controls for rotary wing operation including vertical lift control means, means for periodically varying the angle of incidence of said surface, directional control means, and controls for fixed wing operation, and a single set of control members coupled with all of said controls and coupled with said controls and operable by the pilot for manipulating said controls.

14. In an aircraft, a lifting surface mounted for operation either as a fixed surface or as a rotating surface, and electrodynamic power means for starting said lifting surface from rest for operation as a rotary surface and means associated with the power means for operating it as a brake to arrest the rotation of said lifting surface upon conversion to fixed surface operation, together with means for orienting and locking said surface in the fixed operating position.

15. In an aircraft, a lifting surface mounted for operation either as a fixed surface or as a rotating surface, and fluid pressure power means for starting said lifting surface from rest for operation as a rotary surface and means for operating the power means as a brake to arrest the rotation of said lifting surface upon conversion to fixed surface operation, together with means for orienting and locking said surface in the fixed operating position.

16. In an aircraft, a lifting surface mounted for operation either as a fixed surface or as a rotating surface, and power means for starting said lifting surface from rest for operation as a rotary surface and means associated with the power means for operating it as a brake to arrest the rotation of said lifting surface upon conversion to fixed surface operation, together with means for orienting and locking said surface in the fixed operating position, said power means being reversed after complete stoppage of the lifting surface to turn the same backwards to a locking position.

17. In an aircraft, a convertible lifting surface operable either as a fixed wing surface or as a rotating surface, control means for varying its angle of incidence to its plane of rotation for controlling its lift, an outer race above the center of rotation of said surface and a link fastening the outer race adjustably about the circumference of said race to obtain the desired lead from the pilot's manipulation of said race to its effect upon the stability of the aircraft.

18. In an aircraft of the type convertible to fixed or rotary wing operation, a pair of rotary lifting surfaces rotating in opposite directions, a separate means for each of said surfaces for varying the vertical lift thereof, a directional control surface and a single control element operatively connected with said directional control surface and with said separate control means for vertical lift for differentially changing the angles of incidence of the rotating surfaces and operating said directional control surface simultaneously.

19. In an aircraft, a convertible lifting surface operable either as a rotary surface or a fixed surface, a motor for starting said surface from rest and means converting said motor into a brake for arresting the rotation of the surface upon conversion from rotary to fixed surface operation and means for orienting and locking said surface in fixed position including means for reversing the operation of the motor to impart to the surface a reverse rotation.

20. In an aircraft having a wing mounted for operation either as a rotating wing or a fixed wing, the combination of a power unit capable of operation either as a power unit for starting the rotation of the wing from rest upon conversion to rotary wing operation and also as rotation energy absorbing means for arresting the rotation upon conversion from rotary wing operation and means for converting said power unit from one type of operation to the other while in the air, said power unit comprising an electric motor which is convertible to a dynamic brake for arresting the rotation of the wing.

21. In an aircraft having a wing mounted for operation either as a rotating wing or a fixed wing, the combination of a power unit capable of operation either as a power unit for starting the rotation of the wing from rest and also as rotation energy absorbing means for arresting the rotation upon conversion to and from rotary wing operation and means for converting said power unit from one type of operation to the other while in the air, said power unit comprising a fluid motor which for starting receives fluid pressure from a storage reservoir and for arresting the rotation of the wing supplies fluid under pressure to said reservoir.

22. In an aircraft, a lifting surface mounted for operation either as a fixed surface or as a rotating surface, means for locking said lifting surface in a fixed position comprising a pair of pivoted locking members, one of said members having a lost motion connection with the other and each of said members firmly locking said lifting surface against rotation in one direction.

23. In an aircraft, a lifting surface mounted for operation either as a fixed surface or as a rotating surface, means for locking said lifting surface in a fixed position comprising a pair of pivoted locking members, one of said members having a lost motion connection with the other and each of said members firmly locking said lifting surface against rotation in one direction, one of said members also having a lost motion connection with its pivot.

24. In an aircraft, a single centrally positioned convertible lifting surface operable either as a fixed wing surface or as a rotating surface and having wing halves variable in angle of incidence, a control member operatively connected to vary the angle of incidence of said halves in such manner that when said surface is rotating the lift of said halves is varied equally to achieve vertical control and when said surface is fixed the lift of said halves is varied oppositely to achieve lateral control.

25. In an aircraft, a single, centrally positioned convertible lifting surface operable either as a fixed wing surface or as a rotary wing surface and having halves variable in angle of incidence, means for periodically varying the angle of incidence in rotary-wing operation, and a control member operatively connected to said means, whereby in fixed-wing operation said control member varies the angle of incidence of said halves equally for elevational control.

GERARD P. HERRICK.

REFERENCES CITED

The following references are of record in the file of this patent:

UNITED STATES PATENTS

| Number | Name | Date |
|---|---|---|
| 936,916 | Lee | Oct. 12, 1909 |
| 1,049,927 | Sieg | Jan. 7, 1918 |
| 1,272,846 | Perry | July 16, 1918 |
| 1,419,363 | Earle | June 13, 1922 |
| 1,430,880 | Benster | Oct. 3, 1922 |
| 1,446,531 | Williams | Feb. 27, 1923 |
| 1,506,716 | Pescara | Aug. 26, 1924 |
| 1,546,313 | Pescara | July 14, 1925 |
| 1,557,789 | Bane | Oct. 20, 1925 |
| 1,622,138 | Ellerman | Mar. 22, 1927 |
| 1,672,276 | Nordberg | June 5, 1928 |
| 1,792,014 | Herrick | Feb. 10, 1931 |
| 1,806,927 | Aldrich | May 26, 1931 |
| 1,823,417 | Weber | Sept. 15, 1931 |
| 1,877,902 | Kuethe | Sept. 30, 1932 |
| 1,900,689 | Baum | Mar. 7, 1933 |
| 1,912,354 | Pescara | May 30, 1933 |
| 1,924,481 | Bellanca | Aug. 29, 1933 |
| 2,055,585 | Perrin | Sept. 29, 1936 |
| 2,076,327 | Yurgen | Apr. 6, 1937 |
| 2,088,413 | Hafner | July 27, 1937 |
| 2,187,295 | Alvistur | Jan. 16, 1940 |
| 2,256,635 | Young | Sept. 23, 1941 |
| 2,256,918 | Young | Sept. 23, 1941 |
| 2,322,715 | Kloeren | June 22, 1943 |
| 2,340,241 | Woods | Jan. 25, 1944 |
| 2,383,139 | McGuire | Aug. 21, 1945 |

FOREIGN PATENTS

| Number | Country | Date |
|---|---|---|
| 640,875 | France | Apr. 7, 1928 |